(12) United States Patent
Saffer

(10) Patent No.: US 8,140,336 B2
(45) Date of Patent: Mar. 20, 2012

(54) SPEECH RECOGNITION SYSTEM WITH HUGE VOCABULARY

(75) Inventor: Zsolt Saffer, Vienna (AT)

(73) Assignee: Nuance Communications Austria GmbH, Vienna (AT)

( * ) Notice: Subject to any disclaimer, the term of this patent is extended or adjusted under 35 U.S.C. 154(b) by 940 days.

(21) Appl. No.: 12/096,046

(22) PCT Filed: Dec. 6, 2006

(86) PCT No.: PCT/IB2006/054637
§ 371 (c)(1),
(2), (4) Date: Jun. 4, 2008

(87) PCT Pub. No.: WO2007/066297
PCT Pub. Date: Jun. 14, 2007

(65) Prior Publication Data
US 2008/0294441 A1   Nov. 27, 2008

(30) Foreign Application Priority Data

Dec. 8, 2005 (EP) .................................. 05111839

(51) Int. Cl.
*G10L 15/18* (2006.01)
*G10L 15/04* (2006.01)
*G06F 17/27* (2006.01)

(52) U.S. Cl. ............. 704/257; 704/9; 704/251; 704/254

(58) Field of Classification Search ........................ None
See application file for complete search history.

(56) References Cited

U.S. PATENT DOCUMENTS

| 4,980,918 A * | 12/1990 | Bahl et al. ..................... 704/240 |
| 5,033,087 A | 7/1991 | Bahl et al. |
| 6,243,680 B1 * | 6/2001 | Gupta et al. .................. 704/260 |
| 6,542,866 B1 | 4/2003 | Jiang et al. |
| 6,757,652 B1 * | 6/2004 | Lund et al. ..................... 704/254 |
| 7,149,688 B2 * | 12/2006 | Schalkwyk ................... 704/255 |

(Continued)

FOREIGN PATENT DOCUMENTS

EP   1460615 A1   9/2004

(Continued)

OTHER PUBLICATIONS

Gomez et al., "An approach to obtain weighted graphs of words based on phoneme detection", SPECOM'2004: 9th Conference, Speech and Computer, Sep. 20-22, 2004.*

(Continued)

*Primary Examiner* — Brian Albertalli
(74) *Attorney, Agent, or Firm* — Wolf, Greenfield & Sacks, P.C.

(57) ABSTRACT

The invention deals with speech recognition, such as a system for recognizing words in continuous speech. A speech recognition system is disclosed which is capable of recognizing a huge number of words, and in principle even an unlimited number of words. The speech recognition system comprises a word recognizer for deriving a best path through a word graph, and wherein words are assigned to the speech based on the best path. The word score being obtained from applying a phonemic language model to each word of the word graph. Moreover, the invention deals with an apparatus and a method for identifying words from a sound block and to computer readable code for implementing the method.

15 Claims, 3 Drawing Sheets

U.S. PATENT DOCUMENTS

Figure 1:
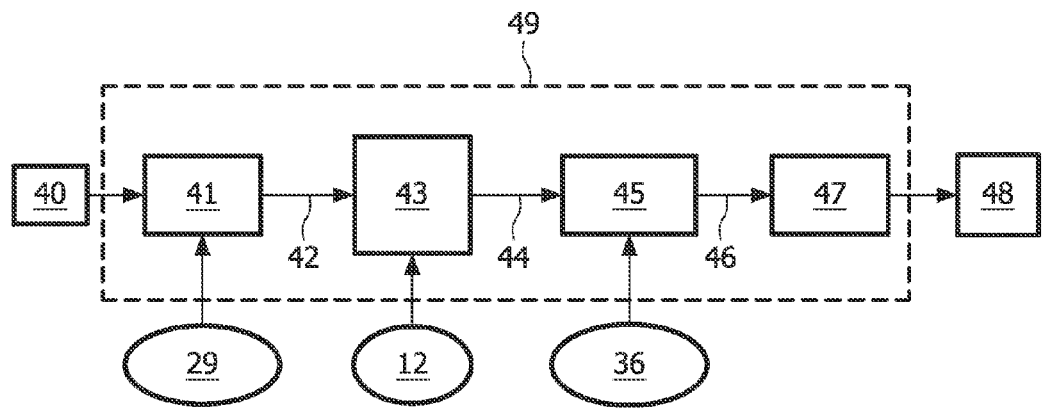

| | | | |
|---|---|---|---|
| 7,783,484 B2 * | 8/2010 | Deligne et al. | 704/254 |
| 2002/0116196 A1 | 8/2002 | Tran | |
| 2003/0009331 A1 * | 1/2003 | Schalkwyk et al. | 704/237 |
| 2004/0034527 A1 | 2/2004 | Hennecke et al. | |
| 2005/0182628 A1 * | 8/2005 | Choi | 704/252 |
| 2008/0103771 A1 * | 5/2008 | Jouvet et al. | 704/250 |

FOREIGN PATENT DOCUMENTS

| | | |
|---|---|---|
| JP | 63-155263 | 6/1988 |
| JP | 2000-267693 | 9/2000 |
| WO | WO 03/090203 A2 | 10/2003 |

OTHER PUBLICATIONS

Demuynck et al., "FLaVoR: a Flexible Architecture for LVCSR", in Proceedings of European Conference on Speech Communications and Technology, 2003.*

Oerder et al., "Word Graphs: An Efficient Interface Between Continuous-Speech Recognition and Language Understanding", ICASSP-93, Apr. 27-30, 1993.*

Bosch et al., "Pronunciation Modeling and Lexical Adaptation Using Small Training Sets", Proceedings Workshop Pronunciation Modelling and Lexical Adaptation for Spoken Language, Sep. 14, 2002.*

First Office Action in Chinese Patent Application No. 200680046025.9 dated Aug. 11, 2010.

Neukirchen et al: "Generation and Expansion O Fword Graphs Using Long Span Context Information"; IEEE International Conference on Acoustics, Speech, and Signal Processing, 2001 (ICASSP'01), vol. 1, pp. 41-44, May 7-11, 2001.

Bazzi et al: "Heterogeneous Lexical Units for Automatic Speech Recognition: Preliminary Investigations"; Acoustics, Speech and Signal Processing, 2000 (ICASSP'00), Proceedings of the International Conference on Jun. 5-9, 2000, Piscataway, NJ, IEEE, vol. 3, pp. 1257-1260.

Kawabata et al: "Japanese Phonetic Typewriter Using HMM Phone Recognition and Stochastic Phone-Sequence Modeling"; IEICE Transactions, vol. E74, No. 7, Jul. 1, 1991, pp. 1783-1787.

Office Action mailed Nov. 15, 2011 in Japanese Patent Application No. 2008-543980.

* cited by examiner

SPEECH RECOGNITION SYSTEM WITH HUGE VOCABULARY

The invention relates to a speech recognition system for identifying words from a sound block, and in particular to a continuous speech recognizer. Moreover, the invention relates to an apparatus and a method for identifying words from a sound block and to computer readable code for implementing the method.

In a speech recognition system, an input sound block is processed by a computer system converting the sound features of the verbal content of the sound block into recognized words. Recognition of speech is a complicated task involving a number of steps. A first step typically includes some kind of acoustic feature extraction, where based on an acoustic resource, sound features representing words or parts of words are extracted from the sound block. The sound features are subsequently scored, the acoustic scoring describes the probability that a feature was produced by a particular word or word part at a given position in the sound block. Pattern matching techniques are used to determine likely sequences of words or parts of words from the sequence of sound features. The words or part of words and the assigned scores are ordered in a graph structure, and in a next step the most likely word sequence through the graph is derived. The most likely word sequence is taken as the recognized words.

U.S. Pat. No. 6,542,866 B1 discloses a method and an apparatus where multiple feature vectors are generated for a segment of an input signal. A decoder generates a path score that is indicative of the probability that a word is represented by the segment of the input signal. The path score is generated by selecting the best feature vector to use for each segment. The path scores are based on different feature vectors for the segment.

Systems of the prior art are to be considered as large vocabulary continuous speech recognizers (LVCSR) capable of recognizing only a limited number of words. In addition to the above described acoustic processing and pattern matching, such systems are based on a user lexicon (ULX) and a classical word language model (LM). The ULX is used to identify words known by the system from the sequences of word parts (phonemes). The word LM is used to score the sequence of words, thereby realizing a modeling on the language level above the acoustic one. The classical word LM is for each known word based on a statistic on word histories, which together consist of n words. Such an LM is trained on a large corpora to observe a large enough number of word histories in order to get significant statistics. Typically for a trigram LM (n=3) having ~64000 modeled words, the required corpora has a size in a magnitude of millions of words. Therefore the main difficulty to increase the number of recognizable words by the state-of-the-art LVCSRs is the need of collecting a sufficiently large corpora. Although user dictionaries and computer power steadily increase so that more words may be handled, only a limited number of words may be recognized.

The inventor of the present invention has appreciated that an improved speech recognition system capable of recognizing an in principle unlimited number of words is of benefit, and has in consequence devised the present invention. Preferably, the invention alleviates, mitigates or eliminates one or more of the above or other disadvantages of the prior art singly or in any combination.

According to a first aspect of the present invention there is provided, a speech recognition system for identifying words from a sound block, the speech recognition system comprising:

word recognizer for deriving a best path through a word graph, each word having assigned a word score and a phonemic transcription, and wherein words are assigned to the sound block based on the best path, wherein the word score of each word in the word graph includes the word score as obtained from applying a phonemic language model (LM) to each word of the word graph.

The speech recognition system is typically a computerized system, where speech are inputted as a sound block, for instance directly as speech from a user by means of a microphone, from a computer system as sound files, from an analogue device capable of outputting speech, etc. The speech recognition system may be used as on-line or off-line recognizer for continuous speech, as well as for a "Command & Control" recognizer. In that case the (grammar) syntax info may be used instead of, or in combination with, the phoneme LM. The speech recognition system may e.g. be used as an interface system between a user and a computer system.

The speech recognition system may either generate a word graph, where each word has assigned a word score and a phonemic transcription, or such a word graph may be generated or provided by another source and made available to the word recognizer. The word graph is such that the word score of each word includes the word score as obtained from applying a phonemic language model (LM) to each word of the word graph. The word score may be taken as the sum of an acoustic phoneme score and the phonemic LM score. The score is normally the negative logarithmic of the found probability.

The present invention is advantageous for a number of reasons. By basing the word graph on phonemic transcription and a phonemic LM, there is no need for a word LM, and the number of recognizable words are not limited by the number of words in the word LM of the recognition system. Instead, the number of recognizable words are only limited by the number of words stored in the lexicon of allowed words, where a huge or even an unlimited number of words may be may made available. A huge number of words may be handled, since the phonemic language model uses the phoneme as the basic unit. The system therefore only needs to deal with language modeling on the phonemic level and not on the word level. As an advantageous consequence of the huge vocabulary handling, only a little amount, or even almost no, out of vocabulary words (OOV) are present, therefore it is not necessary to set up special handling of such situations and major errors that are caused from OOV words. Furthermore, by using a phoneme LM model, non-seen words are dealt with more efficiently than with the traditional word LM, since the phoneme LM has information about the probability of the non-seen words by backing-off instead of using a constant penalty as done in traditional word LM. Moreover, by basing the word graph on the application of a phonemic language model to each word of the word graph, there is no need for LM adaptation, even though an LM adaptation may be conducted, and the speech recognition system can be extended to include any phoneme LM adaptation technique as well. This may be useful e.g. for free-style text having lack of morphologically right word sequences. Moreover, since the speech recognition is based on a phonemic LM, the system can be set to handle free-style language, unexpected word sequences or even random word sequences better than a traditional word-based statistical LM. A conventional recognition system would perform badly in such a situation, whereas the recognition system of the present invention would perform acceptably.

An advantageous embodiment of the system according to the invention is defined in dependent claim 2, where the speech recognition system being based on a lexicon of allowed words comprising more than 200.000 words, such as more than one million words, such as more than one billion words, or even more words, such as in practice an unlimited number of words. Each word entry of the lexicon in addition to a grapheme representation and the phonetic transcription of the word may include the word stem of the word. The lexicon of allowed words is also referred to as the huge word lexicon (HwLex). Due to the huge number of words that can be handled by the system, there is no need for HwLex adaptation, however a HwLex adaptation can be conducted, where new words are added and corresponding data is generated. The HwLex may be adapted without any phoneme LM adaptation.

Advantageous embodiment of the system according to the invention is defined in dependent claims 3 and 4, where the speech recognition system further comprising a phoneme recognizer for extracting from the sound block a phoneme graph, the phoneme graph assigning a phoneme to each edge, and wherein the phonetic transcription of the words in the word graph is based on the phoneme graph, and wherein an acoustic phoneme score is assigned to each phoneme. The phoneme recognizer may acoustically process the sound block by applying any standard acoustic feature extraction technique, such as Mel-frequency cepstrum coefficients (MFCC), Linear predictive coding (LPC), Relative spectral coefficients (RASTA), Perceptual linear prediction (PLP), etc. The acoustic modeling may be based on any phoneme based acoustic modeling, for example a hidden Markov model (HMM) phoneme model with (any) state models (mixtures of Laplace or Gauss distributions). The phoneme recognition core can be any pattern matching based one.

An advantageous embodiment of the system according to the invention is defined in dependent claim 5, where the speech recognition system further comprising a word-phoneme graph generator for converting the phoneme graph to a word-phoneme graph, the word-phoneme graph assigning a word and associated phonetic transcription to each edge. It is advantageous to provide a word-phoneme graph from a phoneme graph, since in this way a direct connection between words of the word-phoneme graph and corresponding phonemes is provided in order to decode the sequence of phonemes into sequences of word.

An advantageous embodiment of the system according to the invention is defined in dependent claim 6, wherein phoneme sequence hypotheses are determined and added to the phoneme graph, and wherein the word-phoneme graph is based on the extended phoneme graph. The phoneme sequence hypotheses are added to the phoneme graph by a phoneme sequence hypotheses generator. It is an advantage to extend the phoneme graph with phoneme sequence hypotheses, since in this way the phoneme sequence hypotheses may, at least to some extend, compensate acoustical errors of the phoneme recognizer, if such errors are present. Moreover, unclear speech may at least to some degree also be recognized due to the hypothesis generating.

An advantageous embodiment of the system according to the invention is defined in dependent claim 7, wherein the extended phoneme graph is filtered by applying the lexicon of allowed words (HwLex), so as to remove phoneme sequences of the extended phoneme graph comprising words which are not present in the lexicon. In this way it is ensured that only allowed words are dealt with. Furthermore, it is an advantage to integrate the filtering step into the phoneme sequence hypotheses generator, since in this way it may be ensured, that not relevant phoneme sequences, i.e. those ones do not match any allowed words are not considered; a more efficient handling of the extended phoneme graph is thereby provided.

An advantageous embodiment of the system according to the invention is defined in dependent claim 8, wherein a time-synchronous word-phoneme graph is provided, and wherein words having no connection either forward or backward in time is removed from the word phoneme graph. In this way it is ensured that dead paths of the word phoneme-graph is removed, providing a more efficient handling of the word-phoneme sequences.

The embodiments of dependent claims 6 to 8 may advantageously be combined and thereby ensuring that only relevant phoneme sequences are considered in the word-phoneme graph.

An advantageous embodiment of the system according to the invention is defined in dependent claim 9, wherein the speech recognition system further comprising a word graph generator for converting the word-phoneme graph to a word graph, the word graph assigning a word to each edge. It is an advantage to assigned possible words of the sound block from a phoneme analysis instead of direct word decoding, since it is a more efficient to work with phonemes as the basic unit, than with words as the basic unit.

An advantageous embodiment of the system according to the invention is defined in dependent claim 10, wherein the phonemic language model is an m-gram language model or a compact variagram. Such types of language models are well known, thereby ensuring a robust language model.

According to a second aspect of the invention, is provided a method of identifying words from a sound block, wherein a best path is derived through a word graph where each word having assigned a word score, and wherein words are assigned to the sound block based on the best path, the score of each word in the word graph includes the word score as obtained from applying a phonemic language model to each word of the word graph.

According to a third aspect of the invention, is provided an apparatus for identifying words from a sound block, the apparatus comprising:
a speech transducer for capturing speech from a sound block,
a speech recognition system,
an output module for outputting recognized words,
wherein the speech recognition system comprising:
word recognizer for deriving a best path through a word graph, each word having assigned a word score, and wherein words are assigned to the sound block based on the best path, and
wherein the word score of each word in the word graph includes the word score as obtained from applying a phonemic language model to each word of the word graph.

The speech transducer may be a microphone or other means for converting captured speech to a digital representation for handling in the speech recognition system. The output module, may be any type of module for outputting words, either in digital form or non-digital form, e.g. in the form of text. The apparatus may be such apparatuses as a dictaphone, a voice controlled apparatus in any form, etc.

According to a third aspect of the invention, is provided computer readable code for implementing the method of the second aspect of the invention.

In general the various aspects of the invention may be combined and coupled in any way possible within the scope of the invention. These and other aspects, features and/or advantages of the invention will be apparent from and elucidated with reference to the embodiments described hereinafter.

Embodiments of the invention will be described, by way of example only, with reference to the drawings, in which FIG. 1. illustrates an embodiment of a word recognizer, FIG. 2. illustrates an embodiment of creating a HwLex, FIG. 3. illustrates an embodiment of performing acoustic training, FIG. 4. illustrates an embodiment of creating a phoneme LM, FIG. 5. illustrates an embodiment of a phoneme recognizer, FIG. 6. illustrates an embodiment of a word-phoneme graph generator, FIG. 7. illustrates an embodiment of a word graph generator.

In the standard large vocabulary continuous speech recognizer (LVCSR) architecture, among others, the user lexicon (ULX) and language model (LM) are basic components. Those together limit the number of recognizable words.

The speech recognition system presented here overcomes this limit, the speech recognition system presented here is referred to as a huge continuous speech recognizer (HVCSR), since is capable of recognizing a huge amount of words, and in principle it is able to recognize an unlimited number of words. The HVCSR does not have a traditional LM and it applies a so-called huge word lexicon (HwLex) instead of the conventional ULX to determine the allowed words of the actually used language. The HwLex stores the words of the actual language and their phonetic transcriptions. The HwLex will be further elaborated upon below. In the HVCSR the information sources are combined differently in comparison with the LVCSR, in order to be able to handle the large number of recognizable words. A HwLex is normally too big to integrate it into the recognizing process as a phoneme tree like in the integrated LVCSR.

FIG. 1 illustrates an embodiment of a huge vocabulary continuous speech recognizer (HVCSR) in accordance with the present invention. The recognizer draws on the three resources the HwLex 12, the acoustic resource 29, and the phoneme LM 36, these are further discussed in connection with FIGS. 2-4.

In a first step, a phoneme recognizer 41 is applied to a sound block 40. The phoneme recognizer processes the incoming sound blocks by using the acoustic resource 29, resulting in a phoneme graph which is outputted 42. The phoneme graph is a representation of probable phonemes, where each phoneme has an acoustic score representing the probability, that a given phoneme was pronounced at a specific audio position.

As a next step, a word-phoneme graph generator 43 is applied to the resulting phoneme graph. The output of the word-phoneme graph generator is the word-phoneme graph 44. The phonetic transcription is also made accessible for each word-edge. The word-phoneme generator has two tasks:

generate phoneme sequence hypotheses, and extend the phoneme graph with them, convert the extended phoneme graph into a word-phoneme graph.

The generator creates phoneme-sequence hypotheses, which are similar to the ones that can be found in the phoneme-graph, and extends the phoneme graph with the hypotheses. Afterwards the extended phoneme graph is parsed by applying the HwLex 12 in order to filter those graph paths, which consist only of sequence of allowed words. HwLex can have more allowed transcriptions for each word, which can also be seen as principal phoneme-sequence hypotheses. As a result of the HwLex parsing, a word-phoneme graph 44 is built up which identifies the words on the graph paths.

In a next processing step, a word graph generator 45 converts the word-phoneme graph into a word graph. Here a phoneme LM 36 is applied to the word-phoneme graph to score the different word sequence hypotheses. It models the phoneme history—also jumping through the word boundaries if necessary—with the average history length of m, m typically being 8-10. Therefore the phoneme LM captures also the information, which is represented by a word LM (bigram, trigram). The phoneme LM scores contribute to determine the probability, that the actual word sequences were pronounced at the current audio position. Due to hypothesis recombination the word-phoneme graph changes, as well as the phoneme content information is no more necessary, so a word graph 46 is generated.

In a final processing step, the best-path calculator 47 selects the most probably word sequence from the word graph which is presented as the recognized words 48.

As mentioned above, the HwLex stores the words of the actual language and their phonetic transcriptions. This makes it possible to identify the allowed words of the language, and to retrieve the phoneme sequence(s) describing the pronunciation of them. Under some non-ideal conditions the words are pronounced different compared to the standard pronunciation. Such conditions are e.g. too fast speech, unclear speech, etc. To support the recognition for such cases as well, the HwLex can contain 'degraded' pronunciations of the words. Formally these can be derived from the standard transcription by inserting, deleting or substituting phonemes. The creation of such biased transcriptions can be based either on artificial or more natural methods. An artificial method is e.g. to derive these transcription variants from the standard transcription by applying a precise criterion by means of some phonetic distance measure. The phonetic distance measure can be e.g. the number of phoneme differences between the transcriptions to be compared. The distance measure criterion can depend on the phoneme length of the transcription variant. The word stem in some extent can be used to recognize the unclear speech because it either does not change or changes just a bit due to the unclearness. Using the pronunciation of the word stem or collect statistically the more often occurred pronunciations under such conditions are more natural constructs. Anyway the creation of such transcription variants can depend on the words to where they belong. Additionally they can have a penalty representing the probability, that the word is pronounced according to the specific transcription variant instead of the original transcription form. Regardless of the used construction method, such transcription variants are also considered as allowed transcriptions.

Figure 2:
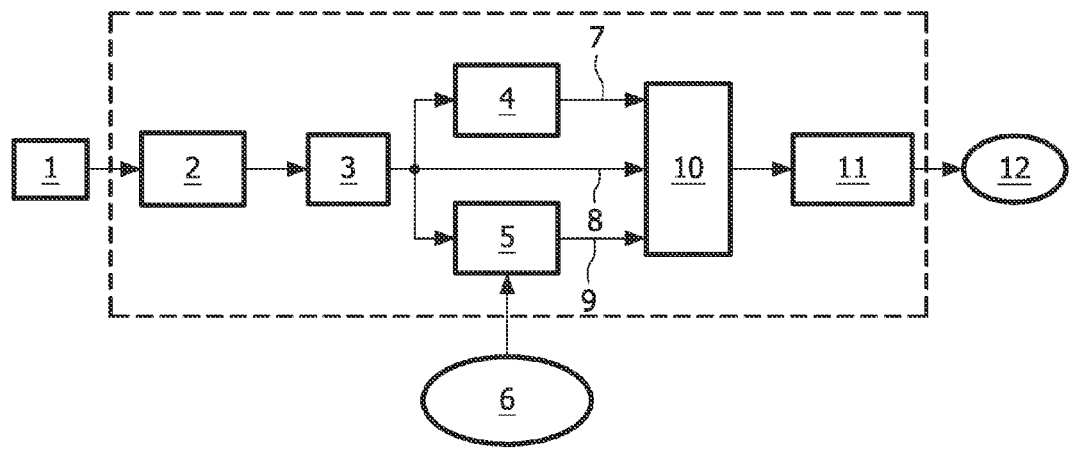

FIG. 2 illustrates a flow chart of the process of creating a lexicon of allowed word (HwLex). The HwLex can be based on a corpora 1 consisting of written text units (e.g. data files) of a huge number of words, as well as corresponding grammar forms of the actual language. In a preprocess step 2 some non-word forms, like punctuations, numbers, etc. may be eliminated or converted to word forms (grapheme sequence). A word iterator 3 applies for each word of the preprocessed corpora the following processing in sequential manner: From each word its 'standard' phonetic transcription 9 and its stem 7 are generated, and they together with the grapheme sequence form 8 of the word serve the input for creating an entry in the raw HwLex. The phonetic transcriber 5 generating the phonetic transcription can be statistically or deterministically depending on the actual setting and language. The word stem identifier 4 works e.g. by applying automatic language specific prefix and postfix filters. A raw HwLex 10 is thereby generated. The raw HwLex is subsequently processed by an allowed transcription builder 11, which can assign further allowed transcriptions and penalties for each entry of the raw HwLex. The allowed transcription builder can use either previously stored lists of more often occurring pronunciation variants, or some phonetic distance measure, or linguistic considerations, like in unclear speech only central part of the word is pronounced. Finally, the modified entry gets into the created HwLex 12.

Figure 3:
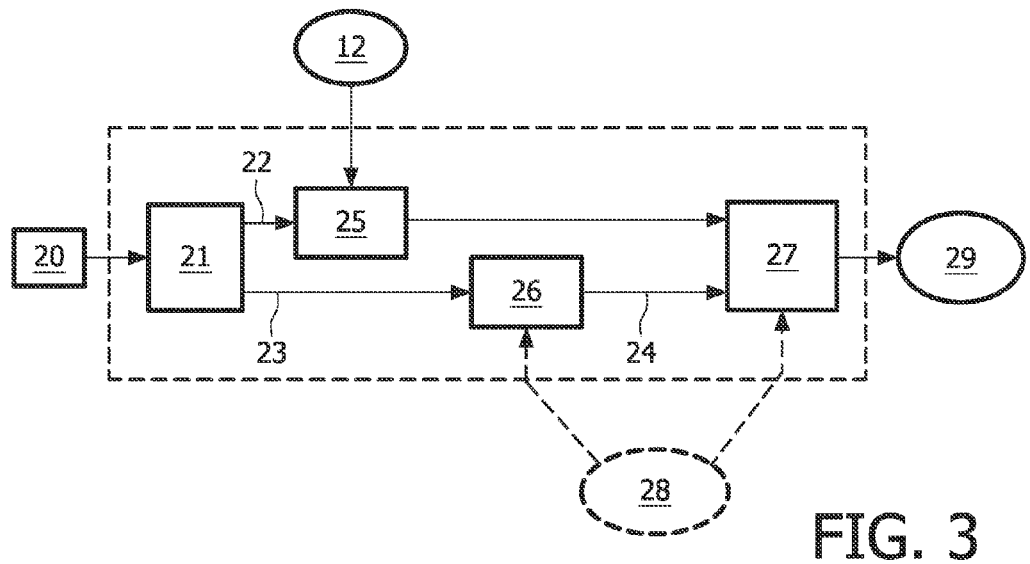

FIG. 3 illustrates a flow chart of training an acoustic resource.

The acoustic resource represents the acoustic properties of the phonemes used for the recognition. It consists of the acoustic models of the phonemes of the actual language.

The acoustic resource is based on inputted training material 20. The training material consisting of a list of material items (e.g. list of material files), which may consist of recorded sounds and corresponding reference texts.

A material iterator 21 iterates through the whole training material breaking it down into material items. For each material item it returns among others the sound and text unit pairs (e.g. files). The text 22 is fed into a phoneme sequence generator 25. The phoneme sequence generator transforms the incoming text into phoneme sequences on word-based manner by reading the necessary phonetic transcriptions from the HwLex 12. The sound of the sound and text unit 23 is fed into an acoustic processor 26. The acoustic processor extracts the essential information from the sound. The resulting acoustic representation 24 is information of a compressed form, which cannot be converted back to the exact original sound, because some information is lost. An acoustic resource trainer 27 applies some acoustic model relevant techniques (like e.g. triphone modeling, phoneme state-tying or cross-word modeling) on the phoneme sequences and the acoustic representation of the corresponding sound parts in order to create the new acoustic resource 29. The acoustic processor 26 and the acoustic resource trainer 27 may optionally consult an actual acoustic resource 28. The acoustic resource trainer 27 iteratively updates the previously trained acoustic resource 28. But in lack of appropriate initial acoustic resource 28, it starts from scratch.

As it was already mentioned, the phoneme LM is an m-gram LM using the phoneme as the basic unit, where m is the history length in number of phonemes. Normally m is greater than n (n being the average number of phonemes in a word), so the model jumps over words. Therefore a space between words is also to be modeled as a special phoneme.

The phoneme LM also has information about the non-seen words due to word-parts have been seen. This means that it models the non-seen words by backing-off to a word part instead of a constant penalty. For example the word "pro-fuse" did not occur in the LM training corpora, but "pro-found" and "con-fuse" did. Applying phoneme LM the probability of "pro-fuse" is estimated by combining the probability of "pro" which has been seen e.g. in "pro-found" and the probability of "fuse" which has been seen e.g. in "con-fuse". Modeling a probability of a language unit sequence by combining the probabilities of its parts is called backing-off. Generally the phoneme LM incorporates the morphologic information both within word and between words, and as a consequence of this, when applying the phoneme LM for hypothesis selection, the phoneme LM prefers the morphologically right word sequences.

Let h note the word history length, then it follows m=h*n. In order to incorporate word bigram or trigram info, h may be taken as 2-3.5, consequently m>8. Additionally m must be greater then the longest word in the huge word lexicon, in order to have at least word bigram history for all words in HwLex. The phoneme LM can also be organized as a more compact varigram, as may be done for word LMs.

Figure 4:
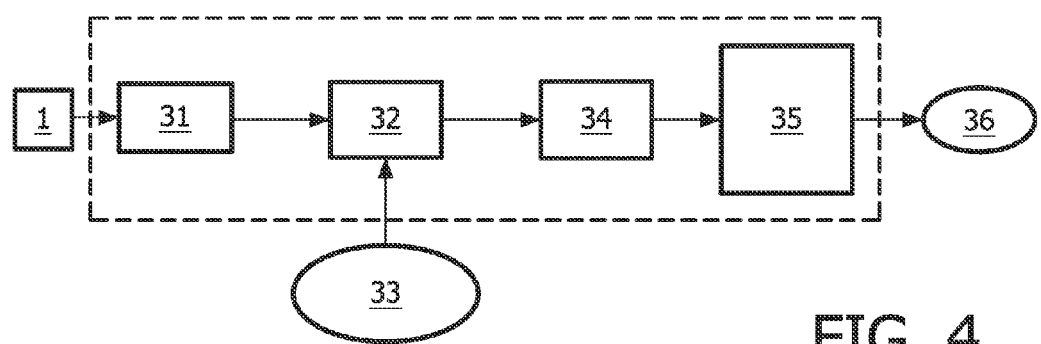

A flow chart of the processing sequence of generating phoneme LM is shown in FIG. 4.

The phoneme LM is like the HwLex based on a corpora 1 consisting of written text units, and as described in connection with the HwLex creation, a preprocessing 31 of the corpora is done in order to avoid non-word forms.

A phonetic transcriber 32 converts the grapheme sequences into phoneme sequences and outputs a phoneme representation of the corpora. The phonetic transcriber 32 utilizes a transcription resource 33. The phoneme representation of the corpora is inputted into a phoneme sequence iterator 34, which iterates through each phoneme sequence passing it to the statistic computation block 35, where the phoneme sequence statistic computations, LM grams estimation are performed. Finally the phoneme LM 36 is built up.

FIG. 2 illustrates an embodiment of how a huge word lexicon can be created, FIG. 3, illustrates an embodiment of building an acoustic resource, and FIG. 4 illustrates an embodiment of providing a phoneme LM. It is, however to be understood, that the described embodiments only provide example of how to provide a resource, other means of providing a huge word lexicon, an acoustic resource, and a phoneme LM may be envisioned.

Figure 5:
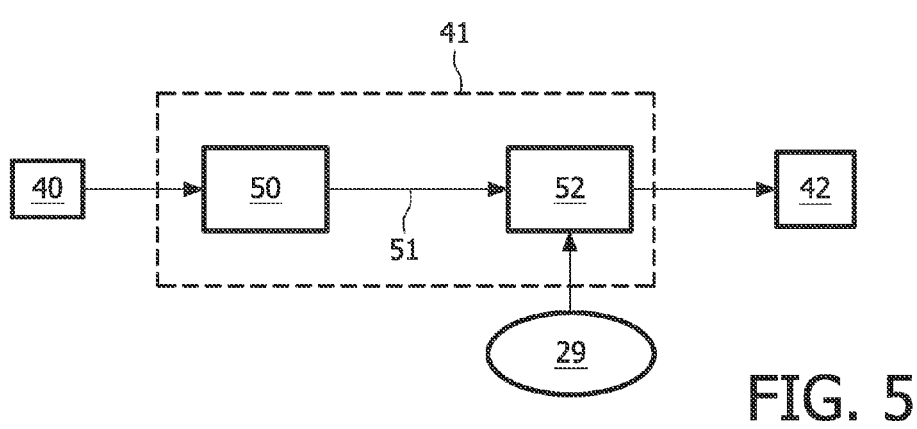
Figure 6:
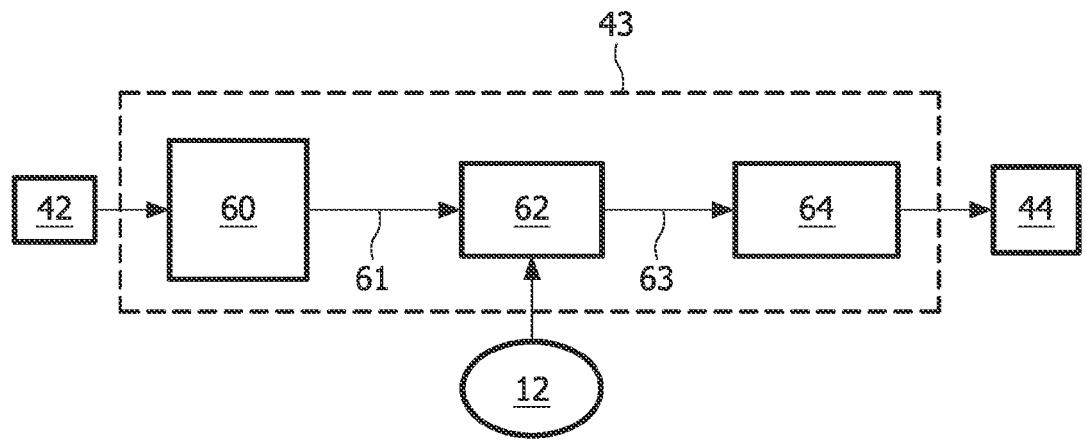
Figure 7:
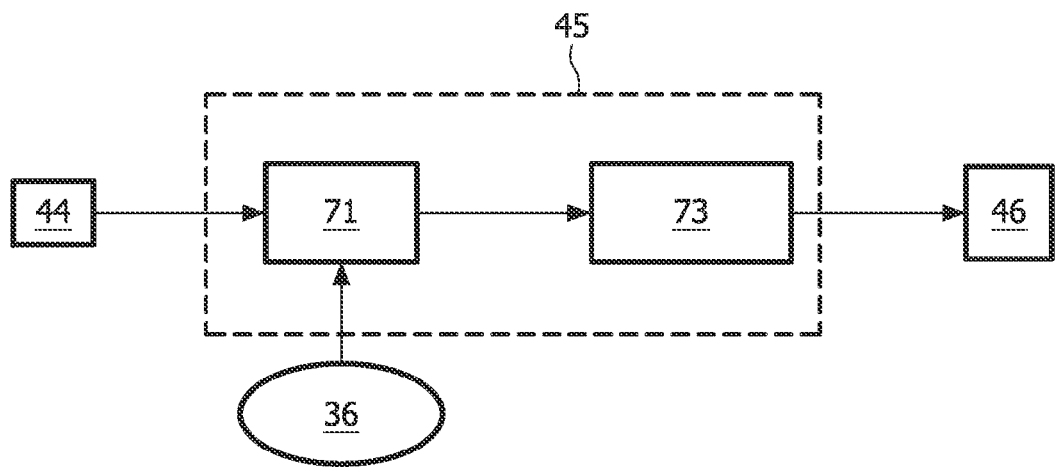

The huge vocabulary continuous speech recognizer illustrated in FIG. 1, is further elaborated upon in connection with FIGS. 5-7.

The phoneme recognizer denoted with 41 in FIG. 1 is shown in greater detail in FIG. 5.

The sound block 40 is first acoustically processed 50. The acoustic processing 50 extracts the essential information from the sound and outputs an acoustical representation 51 which is inputted into a pattern matching block 52. The pattern matching block searches for the most probable phoneme sequence of the incoming acoustical representation 51 of the sound. The result is a sequence of phoneme graphs 42. In the phoneme graph each phoneme has a score representing its probability that it was pronounced once at the time position. Each phoneme graph corresponds to a time-interval. That means, that all paths having the same time interval (and their scores) are comparable.

The word-phoneme graph generator denoted with 43 in FIG. 1 is shown in greater detail in FIG. 6.

As a first step, new phoneme sequence hypotheses are created by a phoneme sequence hypotheses generator 60 and inserted into the phoneme graph to create an extended phoneme graph 61. Each new phoneme sequence hypothesis inherits the accumulative score of the original phoneme sequence hypothesis. Additionally each new phoneme sequence hypothesis can have an additive score, called penalty and representing the probability of replacing the original phoneme sequence hypothesis with the new one. If the number of phonemes is different in the new and the original phoneme sequence hypothesis, then an appropriate score smoothing technique is applied to compute the scores of the phonemes of the new phoneme sequence hypothesis.

A typical way of creating new phoneme sequence hypotheses is to insert phonemes according to their recognition errors from a confusion matrix. This is done in order to compensate the acoustic errors of the phoneme recognizer. This is a HwLex independent method and practically only the most probably recognition errors have to be represented in the new phoneme sequence hypotheses in order to keep the tractability of the graph. This can be achieved by a pruning technique.

Another way of creating new phoneme sequence hypotheses is to apply the allowed transcriptions of the words from the HwLex. Here the allowed transcriptions act as the role of the new phoneme sequence hypotheses. They are not inserted directly from the HwLex into the phoneme graph, but they are detected in the word hypotheses parser 62, as well as they are inserted into the raw word-phoneme graph 63, if appropriate. In this case the penalties of new phoneme sequence hypotheses come from the HwLex. The phoneme sequence hypothesis creation method may be or may include such methods as confusion matrix, allowed word stem, collected pronunciation list, phoneme distance based, etc.

In a subsequent process step, a word hypotheses parser 62 processes the extended phoneme graph. It applies the HwLex 12 to filter the valid phoneme sequence hypotheses in the extended phoneme graph by looking for the allowed transcriptions of the words. During this processing a raw word-phoneme graph 63 is built up. This can be performed e.g. by applying time-synchronous word inserting. For each time point all the found allowed words are inserted into the raw word-phoneme graph, which ends exactly in that time point. Only one copy of the same word having the same start and end time may be inserted into the graph. All inserted words include also its phoneme content. In this way also some dead paths come up in the raw word-phoneme graph, which have no connection either forward to the end point or backward to the start point of the graph. In another setting the word hypotheses parser is directly integrated into the phoneme sequence hypothesis generating process to deal with only the relevant, and therefore much less phoneme sequence hypotheses during filtering the valid phoneme sequence hypotheses.

The dead paths are deleted in a path postprocessing 64 and optionally the word hypotheses are pruned. The resulting word-phoneme graph 44 also provides the access to the phoneme sequence content of the words, which is needed in the next step. Note, that the words inherit the accumulative score and penalty of the constituent phonemes.

The word graph generator denoted with 45 in FIG. 1 is shown in greater detail in FIG. 7.

The word-phoneme graph is inserted into a raw word graph generator 71, which applies the phoneme LM 36 to score each phoneme of the words of the word-phoneme graph. Here the actual language unit is the first phoneme of the current word, and the history constituting previous language units are the remaining m–1 phonemes. Having m greater then the longest word in lexicon, the decided m–1 long phoneme sequence always covers the actual word. The whole phoneme score may be resulted as a combination of the acoustic and the phoneme LM scores. The words inherit the accumulated scores of their phonemes. After scoring the words are recombined. Due to the recombination a new word graph arises, in which the phoneme sequence information is not needed any more. Again, dead paths may be present, and a path postprocessing 73 is applied to cancel the dead paths and optionally performs pruning as well. After the post processing 73, the final word graph 46 is outputted.

The invention can be implemented in any suitable form including hardware, software, firmware or any combination of these. The invention or some features of the invention can be implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described in connection with preferred embodiments, it is not intended to be limited to the specific form set forth herein. Rather, the scope of the present invention is limited only by the accompanying claims.

Certain specific details of the disclosed embodiment are set forth for purposes of explanation rather than limitation, so as to provide a clear and thorough understanding of the present invention. However, it should be understood by those skilled in this art, that the present invention might be practised in other embodiments that do not conform exactly to the details set forth herein, without departing significantly from the spirit and scope of this disclosure. Further, in this context, and for the purposes of brevity and clarity, detailed descriptions of well-known apparatuses, circuits and methodologies have been omitted so as to avoid unnecessary detail and possible confusion.

Reference signs are included in the claims, however the inclusion of the reference signs is only for clarity reasons and should not be construed as limiting the scope of the claims.

The invention claimed is:

1. A speech recognition system for identifying words from a sound block, the speech recognition system comprising:
    a word recognizer for deriving a best path through a word graph, each word in the word graph having assigned a word score and a phonetic transcription, and wherein words are assigned to the sound block based on the best path, wherein the word score of each word in the word graph includes the word score as obtained from applying a phonemic language model to each word of the word graph;
    a phoneme recognizer for extracting from the sound block a phoneme graph, the phoneme graph assigning a phoneme to each edge, and wherein the phonetic transcription of the words in the word graph are based on the phoneme graph; and
    a word-phoneme graph generator for converting the phoneme graph to a word-phoneme graph, the word-phoneme graph assigning a word and associated phonetic transcription to each edge.

2. The speech recognition system according to claim 1, wherein the speech recognition system is based on a lexicon of allowed words comprising more than 200,000 words.

3. The speech recognition system according to claim 1, wherein an acoustic phoneme score is assigned to each phoneme.

4. The speech recognition system according to claim 1, wherein phoneme sequence hypotheses are determined and added to the phoneme graph thereby providing an extended phoneme graph, and wherein the word-phoneme graph is based on the extended phoneme graph.

5. The speech recognition system according to claim 4, wherein the extended phoneme graph is filtered by applying a lexicon of allowed words, so as to remove phoneme sequences of the extended phoneme graph comprising words which are not present in the lexicon.

6. The speech recognition system according to claim 1, wherein a time-synchronous word-phoneme graph is provided, and wherein words having no connection either forward or backward in time are removed from the word-phoneme graph.

7. The speech recognition system according to claim 1, further comprising a word graph generator for converting the word-phoneme graph to the word graph, the word graph assigning a word to each edge.

8. The speech recognition system according to claim 1, wherein the phonemic language model is an m-gram language model or a compact variagram.

9. A method of identifying words from a sound block, the method comprising:
   deriving, with at least one processor, a best path through a word graph where each word in the word graph has assigned a word score and a phonetic transcription, and wherein words are assigned to the sound block based on the best path, wherein the word score of each word in the word graph includes the word score as obtained from applying a phonemic language model to each word of the word graph;
   extracting from the sound block a phoneme graph, the phoneme graph assigning a phoneme to each edge, and wherein the phonetic transcriptions of the words in the word graph are based on the phoneme graph; and
   converting the phoneme graph to a word-phoneme graph, the word-phoneme graph assigning a word and associated phonetic transcription to each edge.

10. The method according to claim 9, further comprising: assigning an acoustic phoneme score to each phoneme.

11. The method according to claim 9, further comprising:
    determining and adding phoneme sequence hypotheses to the phoneme graph thereby providing an extended phoneme graph, and wherein the word-phoneme graph is based on the extended phoneme graph.

12. The method according to claim 11, further comprising:
    filtering the extended phoneme graph by applying a lexicon of allowed words, so as to remove phoneme sequences of the extended phoneme graph comprising words which are not present in the lexicon.

13. The method according to claim 9, wherein the word-phoneme graph includes time-synchronous information, the method further comprising:
    removing from the word-phoneme graph based, at least in part, on the time-synchronous information, words having no connection either forward or backward in time.

14. The method according to claim 9, further comprising:
    converting the word-phoneme graph to the word graph, the word graph assigning a word to each edge.

15. The method according to claim 9, wherein the phonemic language model is an m-gram language model or a compact variagram.

* * * * *